C. BUSCH.
ELECTRICAL ACCUMULATOR.
APPLICATION FILED JULY 15, 1908.
901,322.
Patented Oct. 20, 1908.
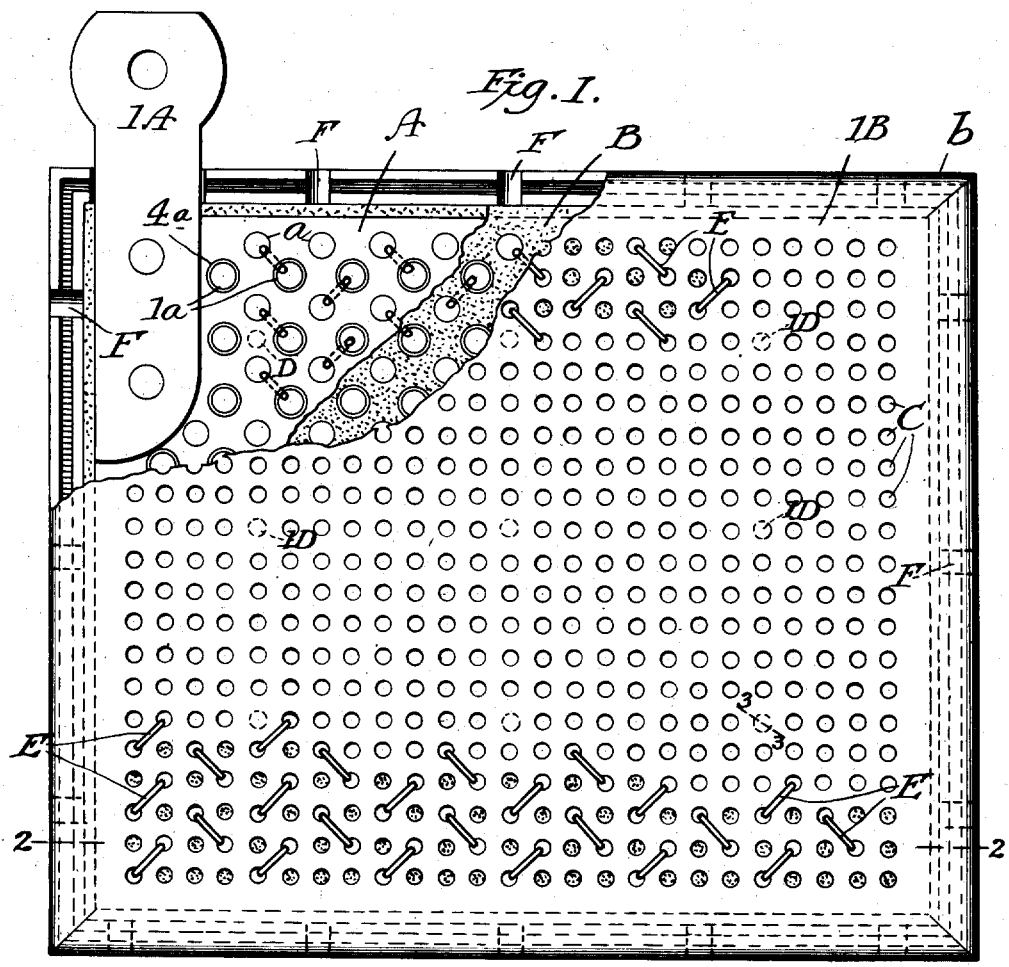
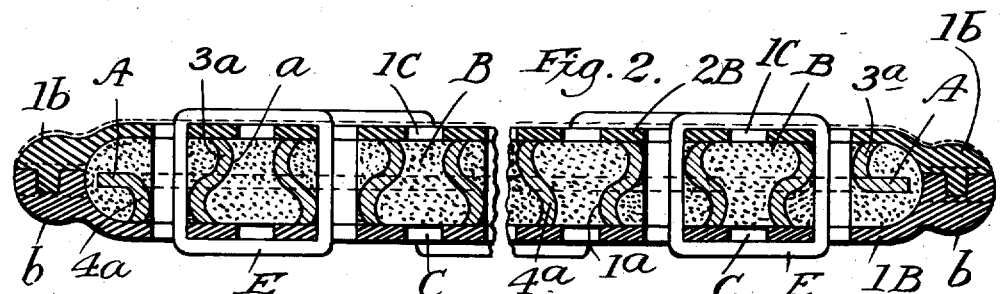
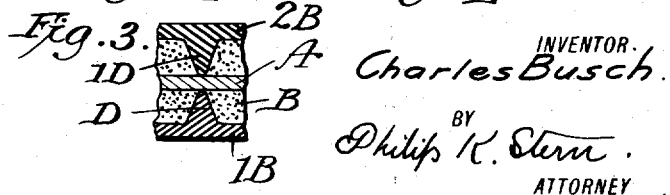
WITNESSES
A. R. Appleman
C. E. Mulreany
INVENTOR.
Charles Busch.
BY
Philip K. Stern.
ATTORNEY

UNITED STATES PATENT OFFICE.

CHARLES BUSCH, OF NEW YORK, N. Y.

ELECTRICAL ACCUMULATOR.

No. 901,322.     Specification of Letters Patent.     Patented Oct. 20, 1908.

Application filed July 15, 1908. Serial No. 443,644.

*To all whom it may concern:*

Be it known that I, CHARLES BUSCH, a citizen of the United States, residing in the city of New York, county of New York, and State of New York, have invented certain new and useful Improvements in Electrical Accumulators, of which the following is a specification.

My invention in electrical accumulators, relates to certain new and useful improvements in the mechanical details and the construction and formation of the elements of lead accumulators and the object thereof is to provide means for insuring durability of the elements of which the active portion of the accumulator is composed and to provide for economy and efficiency in the operation and maintenance thereof. I attain these objects by the construction as illustrated in the drawings hereto attached in which, Figure 1 is a side elevational view of one of my improved elements with a portion of the incasement or envelop broken away to elucidate the interior construction. Fig. 2 is a cross sectional enlarged fragmentary view, taken on the lines 2—2 of Fig. 1, and Fig. 3 is a similar view taken on the lines 3—3 of Fig. 1.

In the several views similar characters of reference are employed to designate like parts throughout, wherein, A depicts a grid composed of lead which is provided with a terminal lug $1^A$ secured to the grid A by riveting or by the well known process of burning. The grid A I prefer to make of rolled sheet lead of such thickness as will be commensurate with rigidity for a given area, as for example in the illustration Fig. 1, the grid A may have a thickness of $\frac{1}{16}$ of an inch which when stiffened by the numerous perforations about to be described will be sufficiently rigid for a grid of the dimension shown. The grid A is formed by the perforations $a$, $1^a$ in parallel rows and in the general formation with respect to each other as illustrated in Figs. 1 and 2. The perforations $a$ are all formed in each row by a punching operation so as to throw a bur on the opposite side, thus leaving a neck $3^a$, which I shall hereinafter refer to as an anchor. The rows of perforations $1^a$ have necks $4^a$ which are similarly formed but on the opposite side, thus forming a grid of lead having alternate protruding necks or anchors on opposite sides of the grid. The grid thus formed is pasted with the required oxid of lead, as is common in accumulators of the character to which my invention relates, up to and within the surface of the necks. The active material which in the case of the negative electrode would be PBO or a mixture of $PBO_2$ and PBO is forced in while in the form of a paste to the interstices between the necks $3^a$ and $4^a$ and in the perforations $a$ and $1^a$. The active material referred to is indicated at B and as will be observed is anchored by the necks $3^a$ and $4^a$ at opposite sides of the grid A. The pasted grid thus formed either for an anode or cathode element of an accumulator cell is placed in a perforated envelop preferably of hard rubber composed of the sections $1^B$ and $2^B$. The sections $1^B$ and $2^B$ have beaded frames $b$ and $1^b$ respectively, and are matched to engage each other as will be clear by the illustrations Figs. 1 and 2. These two sections form substantially an envelop or casing for the pasted grid A, and the sections $1^B$ and $2^B$ are each perforated to afford circulation of electrolyte around the surface of the grid A. These perforations are referred to at C and $1^C$. The perforations C and $1^C$ are of smaller diameter than the perforations $1^a$ and $2^a$ and are arranged coaxial therewith when the grid A is assembled in the casing $1^B$ and $2^B$.

It will be observed that inasmuch as that the perforations C and $1^C$ in the casing are smaller than the perforations $a$ and $1^a$ in the grid A, the active material contained in the grid will be further anchored by the walls of the casing $1^B$ and $2^B$. The sections $1^B$ and $2^B$ of the casing are provided with centering studs D and $1^D$; in the instance illustrated nine of these are shown for each of the sections $1^B$ and $2^B$. These are constructed as illustrated in Fig. 3, and are adapted to center the grid A.

Prior to the hardening of the paste in the grid A the latter is placed upon the centering studs D of the section $1^B$ and pressed down until the active material is penetrated on one side and the leaden sheet rests thereon. Next the section $2^B$ is applied in a manner so as to envelop the grid A. In the meanwhile, the centering studs 1ᴅ will have penetrated the upper surface of the grid A precisely as just described, and the said grid will be centered in the casing. The next operation in forming my accumulator element is to secure the sections 1ᴮ and 2ᴮ and the grid A yieldingly together and to accomplish this I string or lace the said three members together by preferably rubber elastic which I string through alternate perforations in the form of a lacing as illustrated at E. This lacing is passed through the paste and perforations in the grid A in such a manner as to leave alternate perforations in the same parallel row with a lacing and the next perforation without a lacing. The said lacing is also carried through the hard rubber sections 1ᴮ and 2ᴮ of the casing as illustrated in Figs. 1 and 2. It will be observed in Fig. 2 that the lacing in the perforations is so arranged as to admit of free circulation through the element in order that the rubber lacing will be sufficiently unobstructive to block the entire passage way.

In order to enhance the circulation of electrolyte about the grid A, I provide a number of end perforations F, which intercepts the matched portions of the frame $b$ and 1ᵇ.

It will be clear to those who are familiar with the action of accumulator elements of the character to which my invention relates that during the charging operation the active material upon the elements expands somewhat and upon discharging contracts, the effect of which is to loosen the active material from its support which is one of the principal drawbacks in the operation of lead accumulators. The loosening of the active material from its support in accumulators of this character occasions rapid disintegration of the elements and finally the breaking down of the cell. In the process of charging and discharging the active material is usually preceded by an electrochemical process of sulfating and the sulfating is reduced finally to oxidation. In the event of loose contact between the active material and its support sulfating is more or less permanent and a certain percentage of the active material in lieu of being reduced to an oxid is retained in the form of $PBSO_4$. By the novel construction of my element wherein the sections of the envelop B and 1ᴮ are yieldingly applied to the grid A intimate electrical contact is at all times maintained between the active material and its support. Upon the charging of the element and the expansion of the active material thereof, the lacing tension on the rubber lacing E is continually increasing as the degree of ovidation is getting higher, and due to the involute form of lacing between the interstices and the paste surface great pressure is had at all times between the active material and its support.

I am aware that previous to my invention it has been customary to bind the several elements of an accumulator cell together by elastic bands, the object of which however does not fall within the scope of my invention, and I therefore do not claim such means of maintaining the elements in contact as my invention, but I do claim however and desire to secure by Letters Patent of the U. S.

1. In an electrical accumulator element, a perforated electrode, a paste upon the surface of the electrode, a sectional casing for the electrode, perforations in the casing and an elastic binder strung through the perforations of the casing and the perforations of the electrode to maintain the sections in contact with the electrode.

2. In an electrical accumulator element, an electrode, perforations in the electrode, burs formed around the perforations alternately on opposite sides of the electrode, the active material carried by the electrode and anchored by the said burs to the said electrode, a sectional casing for the electrode, perforations in the casing and an elastic lacing strung through the perforations of the casing and the perforations of the electrode to maintain the section of the active material in contact with the electrode.

3. In an electrical accumulator element, an electrode, perforations in the electrode, burs formed around the perforations alternately on opposite sides of the electrode, active material carried by the electrode and anchored by the said burs to the said electrode, a sectional casing for the electrode provided with centering studs, perforations in the casing and an elastic lacing strung through the perforations of the casing and the perforations of the electrode to maintain the sections in contact with the electrode.

4. In an electrical accumulator element, an insulating envelop or casing comprising a pair of laterally adjustable perforated insulating separators each being provided with a marginal frame and adapted to match each other and an elastic lacing strung inwardly between the two.

5. In an electrical accumulator element, an insulating envelop or casing comprising a pair of laterally adjustable perforated insulating separators each being provided with a marginal perforated frame and adapted to match each other and an elastic lacing carried by each and strung inwardly between the two and adapted to pull them together between the perforations.

6. In an electrical accumulator element, an insulating envelop or casing comprising a pair of laterally adjustable perforated insulating separators, provided with inwardly projecting centering studs, each being provided with a marginal end perforated frame and adapted to match each other and an elastic lacing carried by each and strung inwardly between the two and adapted to pull them together between the perforations, substantially as described.

In testimony whereof, I have signed my name to this specification in the presence of two subscribing witnesses.

CHARLES BUSCH.

Witnesses:
MARKUS HANSEN.
C. E. MULREANY.